United States Patent [19]

Lewis

[11] Patent Number: 5,066,712
[45] Date of Patent: Nov. 19, 1991

[54] EMULSION COPOLYMERIZATION

[75] Inventor: Ian D. Lewis, Cheam, England

[73] Assignee: Unilever Patent Holdings B.V., Rotterdam, Netherlands

[21] Appl. No.: 374,587

[22] Filed: Jul. 3, 1989

Related U.S. Application Data

[63] Continuation of Ser. No. 192,023, May 9, 1988, abandoned.

[30] Foreign Application Priority Data

May 8, 1987 [GB] United Kingdom ............... 8710912

[51] Int. Cl.$^5$ ............... C08L 27/06; C08L 31/04; C08L 83/06; C08J 3/03
[52] U.S. Cl. .................. 524/563; 524/823; 525/100; 525/104; 526/216
[58] Field of Search ............ 428/378; 523/205, 206, 523/209; 524/44, 459, 495, 548, 563, 823; 525/100, 104; 526/216

[56] References Cited

U.S. PATENT DOCUMENTS

| | | | |
|---|---|---|---|
| 4,032,487 | 6/1977 | Columbus | 524/44 |
| 4,077,932 | 3/1978 | Columbus | 524/114 |
| 4,146,585 | 3/1979 | Ward et al. | 260/827 |
| 4,444,974 | 4/1984 | Takase et al. | 528/33 |

FOREIGN PATENT DOCUMENTS

| | | |
|---|---|---|
| 0035332 | 9/1984 | European Pat. Off. . |
| 0195406 | 9/1986 | European Pat. Off. . |
| 0214696 | 3/1987 | European Pat. Off. . |
| 1407827 | 9/1975 | United Kingdom . |
| 1539628 | 1/1979 | United Kingdom . |

OTHER PUBLICATIONS

Formulating Guide for Acrylic Latex Caulks, Rohm and Haas, Nov. 1979.
Rhoplex LC-67, Acrylic Emulsion for Plasticizer Free Latex Caulks, Rohm and Haas; Feb. 1976.
Technical Brochure, "Silane Coupling Agents", (Dow) 1981.

Primary Examiner—Thurman K. Page
Assistant Examiner—Carlos Azpuru
Attorney, Agent, or Firm—Cushman, Darby & Cushman

[57] ABSTRACT

Copolymers are formed under pressure, preferably in the presence of a surfactant having an alkylene moiety, and then post reacted with an epoxy silane. The resultant emulsion is usuable e.g. in tile adhesives and paints.

7 Claims, No Drawings

EMULSION COPOLYMERIZATION

This is a continuation of application Ser. No. 07/192,023, filed May 9, 1988, which was abandoned upon the filing hereof.

FIELD OF THE INVENTION

The invention relates to emulsion vinyl polymers intended principally, but not exclusively, for use in adhesive compositions, especially those intended for use with ceramic objects, for example tiles.

BACKGROUND OF THE INVENTION

Aqueous emulsions of vinyl polymers are used as binders in adhesives, paints, pastes and coating materials. The adhesion of these emulsions after drying is not always satisfactory when in contact with mineral substrates, for example ceramics, bricks and glass. The film adhesion is, in particular, weakened when the use environment of the adhesive or other vinyl polymer based material contains moisture. The present invention is directed to improving the use properties of vinyl polymer emulsions intended for use as binders in ceramic tile adhesives. These adhesives are frequently used in high moisture environments, e.g. kitchens and bathrooms.

GENERAL DESCRIPTION OF THE INVENTION

The invention provides novel vinyl copolymer emulsions, processes for their manufacture and adhesive compositions containing them.

The invention provides a process of preparing a copolymer emulsion wherein i) the monomer components are reacted under catalytic emulsion polymerization conditions under a pressure from about 20 bar preferably from about 40 bar to about 100 bar to provide an emulsion of polymer particles with a surface capable of reacting with an epoxy moiety and ii) the emulsion is reacted chemically with from about 0.1% to about 3% by weight of an epoxy silane material usually at a temperature in the range 20° C. to 60° C. Preferably the polymer is a vinyl acetate/vinyl chloride/ethylene terpolymer, more preferably having the composition ratio

| vinyl acetate: vinyl chloride | 4.0 to 0.54:1 |
| vinyl acetate: ethylene | 13.3 to 1.5:1 |
| vinyl chloride: ethylene | 1.0 to 11.5:1 | more preferably the weight percentages of the monomers are

| vinyl acetate (vinyl ester of C2 to C18 alkanoic acid) | 30% to 70% |
| vinyl chloride | 15% to 60% |
| ethylene (alkylene) | 5% to 20% |
| Additional monomers 0.1 to 10% | |

Vinyl acetate is an example of a vinyl ester of a C2 to C18 alkanoic acid to which the invention is generally directed.

A preferred class of epoxy silanes has the formula:
X—Si (OR)3
wherein X is an alkyl group containing a reactive epoxy moiety and the three R radicals, which may be the same or different, are each hydrogen or a C1 to C4 alkyl radical with not more than two of the R radicals being hydrogen.

The invention includes a copolymer emulsion post reacted with from about 0.1% to about 3% by weight of an epoxy silane. A preferred feature of the invention is the use of a surfactant including a C14 to C20 alkylene moiety in the emulsion polymerization. Examples of such surfactants are an oleyl propanol amide sulphosuccinate obtainable from Witco of USA under the trade name E mcol K8300 and the potassium salt of the sulphonation product of oleic acid obtainable from Lankro Chemicals of Manchester England under the trade name Lankropol OPA. The use of a surfactant of this class provides a marked enhancement of the effect obtained from the epoxy silane.

There is no criticality in the monomers used in the manufacture of the copolymer emulsion. It is believed the external surface of the emulsion particles should include groups capable of reacting chemically with the epoxy silane component. In this description the preferred group is the carboxyl group which includes both the acidic group and the ionised, i.e. carboxylate, group. This reaction is an explanation of the technical benefit noted but is not presented as a proven reaction.

The use of a post reaction step allows the preparation of necessary product amounts as required from a base stock of copolymer emulsion, the latter being usuable for other applications. Thus the emulsion feedstock is available for use in a flexible manner.

The monomer composition subjected to emulsion polymerization may be consistent during polymerization or may be varied so that the component providing the external groups reacting with the epoxy groups is only present during the final stage of the polymerization process.

Examples of the vinyl monomers usable in the preparation of the emulsions of the invention are vinyl esters of C2 to C18 carboxylic acids e.g. vinyl acetate and vinyl propionate, vinyl chloride, alkylenes e.g. propylene and ethylene, vinyl mono-carboxylic C2 to C10 acids e.g. acrylic acid, alkyl acrylates, hydroxy acrylates, methacrylates, diacrylates, and crosslinking agents e.g. diallyl phthalate and N-methylolacrylamide.

The epoxy silane is preferably a gamma glycidoxy silane. Examples of silanes are gamma—glycidoxy propyl trimethoxy silane and gamma—glycidoxy propyl methoxy diethoxy silane.

The copolymer emulsions are usable as components in structural adhesives used, for example as tile adhesives, emulsion based paints, emulsion based plasters and other compositions.

Structural adhesives will generally comprise:
i) from 5% to 40% by weight of the copolymer solids, usually 10% to 25%,
ii) from 15% to 85% by weight, usually 40% to 70%, of particulate filler, and
iii) from 15% to 45%, usually 20% to 40% by weight of aqueous phase which amount includes the water in the copolymer emulsion.

Examples of the fillers are quartz powder, kaolin, silica and milled minerals e.g. feldspar, gypsum, chalk and talc. The adhesive is obtained by simple mixing of the components, usually by adding the solid components into the mixed liquid materials. Wetting agents, fungicides and thickeners may be added.

Emulsion based paints will usually comprise:
i) 5% to 35% by weight of copolymer solids, ii) 5% to 35% by weight of aqueous phase including water present in the emulsion,
iii) 5% to 55% by weight of filler, and
iv) 5% to 30% by weight of pigment.

The fillers will include those listed for adhesive use and the pigments will include titanium dioxide, zinc oxide and zinc sulphide. Optional components such as wetting agents, thickeners, fungicides, anti-foaming agents and film forming auxiliaries may be present.

Emulsion based plasters include coarse fillers, e.g. stone fragments of size 0.2 mm to 5 mm, in addition to the copolymer emulsion solids and water.

LITERATURE

Copolymerisation of an organo-silicon compound with polymerisable monomers to form a silanol containing emulsion is disclosed in GB 1407827 (Wacker). This emulsion is disclosed as giving improved wet strength to ceramic tile adhesives. EP 0195406 (Mitsubishi Petrochemical) discloses the reaction of a water absorbing polymer with a silane coupling agent to improve the water absorption properties of the polymer. EPA 0214696 (DSM) describes reaction of a low pressure copolymer with an epoxy silane.

TEST PROCEDURES

The utility of the emulsion vinyl polymers of the invention is demonstrated by testing the wet strength of bonds obtained using adhesives containing the polymers. A standard tile adhesive of formula:

| | |
|---|---|
| Filler sand (HPF3) | 600 g |
| Water | 140 g |
| Polymer Emulsion (ca 50% non-volatile content) | 100 g |
| Formalin (fungicide) | 2 g |
| Antifoam (Hercules 1512M) | 0.5 g |
| Coalescing solvent (Dalpad A) | 5 g |
| Thickener (Celacol HPM 5000 DS) | 3 g | was prepared by mixing antifoam and fungicide in the water base and then the solvent and thickener with slow stirring. When these additives had been dispersed the emulsion was mixed in. When a homogeneous mixture was obtained the filler was added with rapid stirring over a short period.

The adhesive composition was left for a day and then used to prepare test bonds. Ceramic tile test pieces using standard tiles were prepared and tested in accordance with BS 5980:1980.

Those used for the dry test were conditioned in air for 14 days at 20° C. and 65% RH and the samples for the wet test conditioned for 7 days at 20° C. and 65% RH in air and then immersed in water for 7 days at 20° C.

SPECIFIC DESCRIPTION OF THE INVENTION

Examples of the polymers and process of the invention will now be given to illustrate but not limit the invention.

EXAMPLE I

This example describes a silanised terpolymer of vinyl acetate, vinyl chloride and ethylene.

The polymer was produced from a monomer composition of:

| | |
|---|---|
| Vinyl acetate | 1052 g |
| Vinyl chloride | 412 g |
| Ethylene | 165 g |
| Acrylic acid | 4.1 g |

An aqueous solution with the composition listed below was prepared and loaded into a stirred pressure reactor (3.7 l capacity).

| | |
|---|---|
| Anionic surfactant* (50% aqueous) | 99 g |
| Ferric chloride | 0.01 g |
| Water to 52% non-volatile content | |
| Formic acid to give pH 4.0 to 4.5 | |

*obtained from Lankro Chemicals Limited of Manchester, England under the trade name Lankropol OPA. This is the potassium salt of sulphonated long chain unsaturated fatty acids.

The reactor was flushed first with nitrogen and then with ethylene. The agitator was then started, the vessel contents heated to 30° C. and part of the ethylene component introduced into the vessel to give a pressure of 28 bar.

5% by weight of each of the vinyl acetate, vinyl chloride and acrylic acid monomers were added at this stage to form an initial monomer charge.

Initiator containing solutions having the compositions A and B had been prepared.

| | | |
|---|---|---|
| A. | Ammonium persulphate | 6.6 g |
| | Sodium bicarbonate | 6.6 g |
| | Water | 250 g |
| B. | Sodium formaldehyde sulphoxylate dihydrate | 2.6 g |
| | Sodium vinyl sulphonate (25% aq) | 66.0 g |
| | Water | 200 g |

When the monomeric first stage had been completely added, the continuous additions of these initiator containing solutions were commenced along side the remainder of the monomers.

The monomer components were added continuously over a period of 5 hrs whilst the initiator solutions were added over 6 hrs. Once the reaction had begun the internal temperature was raised to 60° C. over 3 hrs; and after 30 mins at 60° C. ethylene was added to maintain a pressure of 28 bar for 4 hrs.

When the additions were complete the reactor contents were cooled to ambient temperature while adding final stage initiator containing solutions C and D over a period of 1 hr.

| | | |
|---|---|---|
| C. | t-butyl hydroperoxide | 5.0 g |
| | Disodium phosphate dihydrate | 4.2 g |
| | Water | 40.0 g |
| D. | Sodium metabisulphite | 5.0 g |
| | Water | 40.0 g |

When the emulsion had been cooled and 4.0 g of preservative added, 1.0% on emulsion weight of gamma-glycidoxypropyl trimethoxysilane (obtained from Dow Corning of Michigan USA under the Trade Name Z-6040) was added dropwise to the polymer at ambient temperature. When the silane had been added the blend was stirred for 30 minutes and then allowed to stand for 24 hours before use.

The polymer emulsion product from Example I was formulated into tile adhesives having the Test Procedure compositions. Comparison adhesives were prepared using i) the emulsion from Example I which had not been post reacted with epoxy silane and ii) emulsions formed by copolymerising the base monomers with an equivalent amount of a vinyl silane in accordance with the process generally described in GB1407827 (Wacker).

The Dry bond and Wet bond strengths were measured as described previously and are quoted in Table I.

TABLE I

| Polymer emulsion used in adhesive | Dry Bond Strength (kN) | Wet Bond Strength (kN) |
|---|---|---|
| Copolymer without post reaction | 12.6 | 0.4 |
| Copolymer with copolymerised vinyl silane | 14.1 | 3.7 |
| Post reacted emulsion of invention | 17.3 | 8.5 |
| British Standard (BS 5980: 1980) | 8.9 | 4.5 |

All the adhesive compositions prepared were stable and suitable for their intended use. It will be seen the use of post-reacted emulsions of the invention provide improved dry and wet bond strengths compared with the unreacted base terpolymer and copolymer and these polymer compositions subjected to copolymerisation with vinyl silane. The adhesives using the emulsions of the invention also satisfy the appropriate British Standard.

EXAMPLE II

This example compares the bond strengths of adhesives formed from emulsions A and B whose preparation was identical except for the use of two surfactants during polymerization. A copolymer with the composition vinyl acetate 39.5%, vinyl chloride 50%, ethylene 10% and acrylic acid 0.5% was prepared in a redox initiated system using sodium persulphate (0.75%) and sodium formaldehyde sulphoxylate dihydrate (0.25%). The surfactants used were Lankropol OPA (emulsion A) and GAFAC RE-610, an ethoxylated alkyl phenol ester of phosphoric acid obtainable from GAF Chemicals of New York USA (emulsion B).

The monomers were added over 4 hours at 50° C. with 35% of the monomers, other than vinyl chloride, present initially. The initiator was added over 4.5 hours at 50° C.

The emulsions obtained were formulated into tile adhesives and test for bond strength as given in Table II. Epoxy silane (Z6040) was added to the emulsions at the levels shown on the emulsion weight before formulating.

TABLE II

|  | Dry Bond Strength (kN) | Wet Bond Strength (kN) |
|---|---|---|
| Emulsion A | 9.42 | 0.41 |
| + silane (0.5%) | 13.16 | 6.03 |
| + silane (1.0%) | 15.1 | 8.28 |
| Emulsion B | 9.60 | zero |
| + silane (0.5%) | 11.30 | 2.91 |
| + silane (1.0%) | 13.37 | 4.88 |

The use of the preferred surfactant provides improved bond strengths, and this is particularly seen with the wet bond strength.

EXAMPLE III

This example demonstrates the improvement in the properties of a paint formulation when formulated with an emulsion of the invention.

The copolymer was produced from a monomer composition of

| vinyl acetate | 1135 g |
|---|---|
| vinyl chloride | 380 g |
| 2-ethylhexyl acrylate | 133 g |
| ethylene | 228 g |
| acrylic acid | 4.75 g |

An aqueous solution with the composition below was prepared, loaded into a stirred tank reaction (3.71 capacity) and heated to 40° C.

| Lankropol OPA (50% aq) | 114 g |
|---|---|
| Formic acid | 4 mls (pH 3.5 to 4.0) |
| Ferric chloride (1% aq) | 0.95 mls |
| Distilled water | 940 g |

After purging with nitrogen and ethylene the vessel was pressurised with 55 bar ethylene. Initiator solutions A and B had been prepared.

| A | Sodium persulphate | 7.6 g |
|---|---|---|
|  | Sodium bicarbonate | 7.6 g |
|  | Distilled water | 200 g |
| B | Sodium formaldehyde sulphoxylate dihydrate | 3 g |
|  | Sodium vinyl sulphonate (25% aq) | 76 g |
|  | Distilled water | 132 g |

285g of the monomer mixture, excluding ethylene, was pumped into the vessel and held for 10 minutes. The remainder of the monomers was added over 4 hours. The solutions A and B were added over 6 hours with the first 15 minutes and final 45 minutes added at double rate. During the first 30 minutes addition the temperature was raised to 50° C. and maintained thereafter.

After these additions the reaction mass was held for 30 minutes and then the solutions

| t-butyl hydroperoxide | 5.7 g |
|---|---|
| Distilled water | 50 g |
| and |  |
| Sodium metabisulphite | 3.6 g |
| Distilled water | 50 g |

Added over 30 minutes while cooling.

Silane Z6040 was then added at a level of 1% on the emulsion and the emulsion left for 24 hours before formulating a test paint.

This paint comprised (in parts by weight)

| Titanium dioxide | 52.4 |
|---|---|
| CaCo$_3$ whitener | 420.5 |
| Dispersants | 35.4 |
| Potassium hydroxide (50% aq) | 0.70 |
| Thickener | 191.20 |
| Water | 207.40 |
| Coalexer solvent | 7.5 |

| | |
|---|---|
| Bactericide | 0.4 |
| Emulsion | 84.50 |
| | 1000.00 |

The paints were at 82% PVC made by appropriate adjustment of the above formulation. Paint A contained a non-silanised emulsion and paint B the silanised (1% level) emulsion. Test pieces were made by drawing down a 5 micron wet film of the paint onto a plastic foil. The panels were allowed to dry for 7 days and then scrubbed on a sheen apparatus using water as medium.

Paint A required 2,000 scrubs to produce significant failure while Paint B after 4,500 scrubs did not show so much damage.

I claim:

1. A process of preparing a vinyl copolymer emulsion wherein
   i) the monomer components are reacted under pressure emulsion polymerization conditions from about 20 bar to about 100 bar in the presence of a surfactant including C14 to C20 alkenylene moiety to provide an emulsion of vinyl polymer particles with a surface capable of reacting with an expoxy moiety and
   ii) the emulsion is reacted chemically with from about 0.1% to about 3% by weight of an epoxy silane material.

2. A process according to claim 1 wherein the vinyl polymer is a vinyl alkanoate/vinyl chloride/alkylene terpolymer.

3. A process according to claim 1 or 2 wherein the epoxy silane has the formula:

$$X-Si(OR)_3$$

wherein X is an alkyl group containing a reactive epoxy moiety and the three R radicals, which may be the same or different, are each hydrogen or a C1 to C4 alkyl radical with not more than two of the R radicals being hydrogen.

4. A pressure vinyl copolymer emulsion formed under pressure emulsion polymerization conditions from about 20 bar to about 100 bar in the presence of a surfactant including a C14 to C20 alkylene moiety post reacted with from about 0.1% to about 3% by weight of an epoxy silane.

5. A tile adhesive comprising
   i) from about 15% to about 85% of solid particulate filler,
   ii) from about 5% to about 40% of copolymer emulsion particles as defined in claim 4, and
   iii) from about 15% to about 45% of aqueous phase.

6. An emulsion paint based on the vinyl copolymer emulsion of claim 4 comprising by weight:
   5% to 35% of vinyl copolymer solids,
   5% to 35% of an aqueous phase including water present in the emulsion,
   5% to 55% filler, and
   5% to 30% pigment.

7. The process according to claim 1, wherein the surfactant containing an unsaturated alkenylene moiety is selected from the consisting of oleyl propanol amide sulphonsuccinate and an oleic acid sulphonate.

* * * * *